J. COWAN.
COMBINED LIME-KILN AND GAS GENERATOR.
No. 183,644. Patented Oct. 24, 1876.
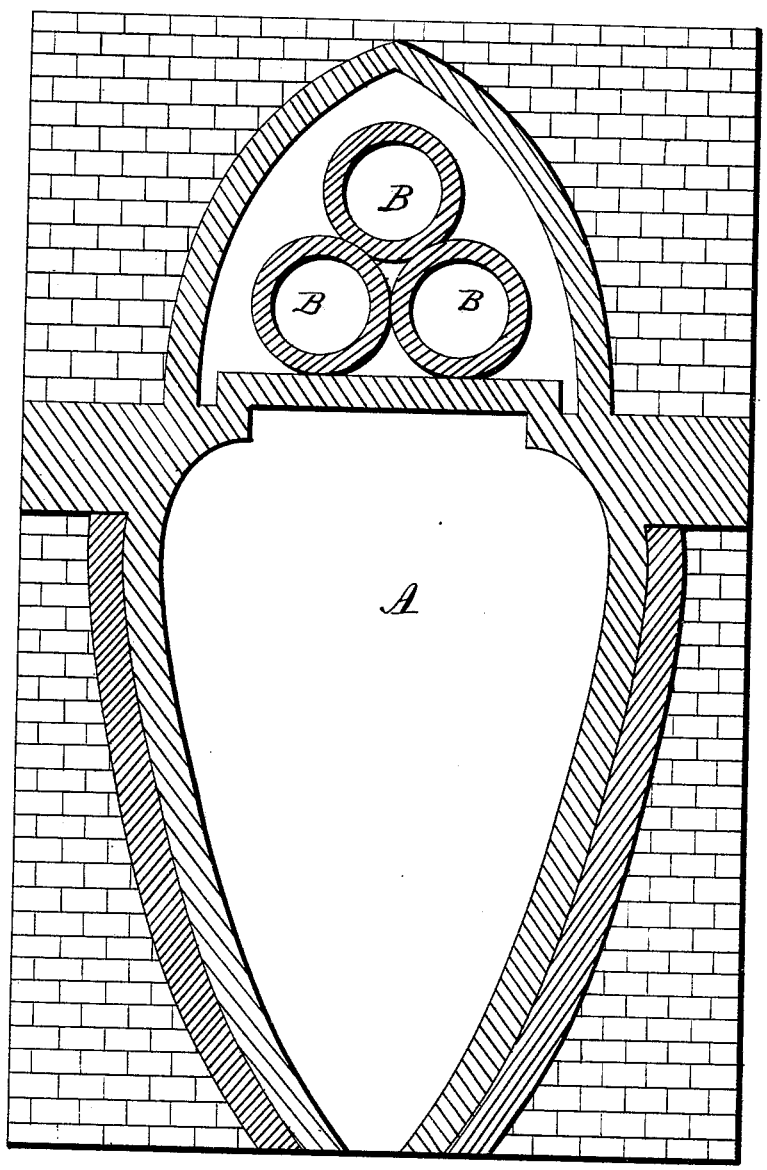

UNITED STATES PATENT OFFICE.

JOHN COWAN, OF LONDON, ENGLAND.

IMPROVEMENT IN COMBINED LIMEKILN AND GAS-GENERATOR.

Specification forming part of Letters Patent No. 183,644, dated October 24, 1876; application filed May 15, 1875.

*To all whom it may concern:*

Be it known that I, JOHN COWAN, of London, England, have invented a certain new and useful Improvement in Combined Limekiln and Gas-Generator; and I do hereby declare the following to be a full, clear, and exact description of the invention, such as will enable others skilled in the art to which it pertains to make and use it, reference being had to the accompanying drawings, which form part of this specification.

In the drawings is represented a cross-section of my device, showing the ledge or support on which rests the retorts.

My invention has relation to an improvement in the manufacture of lime and illuminating-gas at one and the same time; and consists in a limekiln constructed with a closed mouth, and having one or more retorts placed within the lime-chamber, and just above the burning stone.

Referring to the drawing, A is a kiln, of any desired character, provided only that it be constructed with a closed mouth, and its draft is obtained by a connecting-chimney. B is one or more retorts, of suitable or ordinary form, which rest for support upon ledges or shelves, but allow of a full and open communication with all the lower space or part of the chamber, so that the heat and flame can suffer no hinderance or reacting tendency therefrom.

The operation of the device is at once seen, and consists in filling or feeding the kiln, as is usual in kilns of similar nature, with limestone and coal, and causing a strong combustion, which will not only serve to produce the calcined lime, but which also operates both in heat and flame upon the retorts filled with the material from which illuminating-gas is to be generated. As the gas is produced it is passed off by any suitable mechanism, and subjected to the ordinary processes of purification.

It is thus apparent that by utilizing the otherwise waste heat and flame of the kiln in its production of lime for the market, I am enabled to manufacture illuminating-gas at far less cost than is the usual expense.

I am aware that the broad idea above mentioned is by no means new; but the special method I adopt, and the exact construction of parts herein shown, are different and new.

There have been kilns built with an open mouth, and with retorts embedded in the limestone, also with a separate compartment or chamber for the retorts; but both of these forms or types of kiln are dissimilar to mine, and do not answer the purpose I have in view.

Having thus fully described my invention, what I claim as new, and desire to secure by Letters Patent, is—

In combination with a limekiln having closed mouth, one or more gas-retorts, supported just below said mouth within the limestone-chamber, and above the calcining limestone, whereby the retorts are subjected to the direct action of the waste flame and heat without being embedded in the calcining matter, substantially as and for the purpose described.

In testimony that I claim the foregoing I have hereunto set my hand this 2d day of April, 1875.

JOHN COWAN.

Witnesses:
WILLIAM BRENNON,
JOHN KNIGHT.